(12) United States Patent
Odaka et al.

(10) Patent No.: US 7,372,186 B2
(45) Date of Patent: May 13, 2008

(54) ELECTROSTATIC MOTOR WITH CLEARANCE MAINTAINING STRUCTURE

(75) Inventors: Shunichi Odaka, Minamitsuru-gun (JP); Isao Kariya, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 104 days.

(21) Appl. No.: 11/038,223

(22) Filed: Jan. 21, 2005

(65) Prior Publication Data

US 2005/0162036 A1 Jul. 28, 2005

(30) Foreign Application Priority Data

Jan. 23, 2004 (JP) ............................. 2004-016111

(51) Int. Cl.
*H02N 1/00* (2006.01)
(52) U.S. Cl. .................................................... 310/309
(58) Field of Classification Search ................ 310/309
See application file for complete search history.

(56) References Cited

U.S. PATENT DOCUMENTS

| | | | | |
|---|---|---|---|---|
| 4,754,185 A | * | 6/1988 | Gabriel et al. ............... | 310/309 |
| 5,461,272 A | * | 10/1995 | Matsumoto ................... | 310/309 |
| 5,541,465 A | * | 7/1996 | Higuchi et al. .............. | 310/309 |
| 5,585,683 A |  | 12/1996 | Highuchi et al. ........... | 310/309 |
| 5,791,883 A | * | 8/1998 | Ban et al. ................. | 417/410.5 |
| 2005/0162036 A1 | * | 7/2005 | Odaka et al. ............... | 310/309 |

FOREIGN PATENT DOCUMENTS

| EP | 1 317 054 |   | 6/2003 |
|---|---|---|---|
| JP | 63154073 | * | 6/1988 |
| JP | 05-260766 |   | 10/1993 |
| JP | 6-78566 |   | 3/1994 |
| JP | 8-51786 |   | 2/1996 |
| JP | 2000-143024 |   | 5/2000 |

(Continued)

OTHER PUBLICATIONS

Yamamoto A et al., "High Precision Electrostatic Actuator with Novel Electrode Design", Micro Electro Mechanical Systems, Jan. 25, 1998, pp. 408-413.

(Continued)

*Primary Examiner*—Karl Tamai
(74) *Attorney, Agent, or Firm*—Drinker Biddle & Reath LLP

(57) ABSTRACT

An electrostatic motor provided with a stationary member including a first major surface and a first back surface opposite to the first major surface; and a movable member including a second major surface and a second back surface opposite to the second major surface, the movable member being arranged to be movable relative to the stationary member in a condition where the second major surface is opposed to the first major surface of the stationary member. The electrostatic motor includes a protuberance provided to project from at least one of the first major surface of the stationary member and the second major surface of the movable member, for ensuring a predetermined clearance between the first major surface and the second major surface. The electrostatic motor may include a plurality of stationary members and a plurality of movable members, assembled with each other in a manner as to alternately arrange the stationary members and the movable members. In this arrangement, the electrostatic motor may further include a back-side protuberance provided to project from at least one of the first back surface of each of the stationary members and the second back surface of each of the movable members, for ensuring a predetermined clearance between the first back surface and the second back surface.

9 Claims, 9 Drawing Sheets

FOREIGN PATENT DOCUMENTS

| | | | |
|---|---|---|---|
| JP | 2001-178154 | * | 6/2001 |
| WO | 91/16757 | | 10/1991 |

OTHER PUBLICATIONS

Niino T et al., "X-Y Positioner Driven by Electrostatic Motor", Industry Applications Conference, Oct. 6, 1996, vol. 4, pp. 1974-1979.

Niino T et al., "High-Power and High-Efficiency Electrostatic Actuator", Proceedings of the Workshop on Micro Electro Mechanical Systems, Feb. 7, 1993, vol. Workshop 6, pp. 236-241.

Yamamoto A et al., "High Precision Positioning Control using High-Power Electrostatic Linear Drive", Journal of the Japanese Society for Precision Engineering, 1998, vol. 64, No. 9, pp. 1385-1389.

* cited by examiner

ELECTROSTATIC MOTOR WITH CLEARANCE MAINTAINING STRUCTURE

BACKGROUND OF THE INVENTION

1. Field of the Invention

The present invention relates to an electrostatic motor which generates a driving force from an electrostatic force.

2. Description of the Related Art

There has been developed an electrostatic motor in which each of a stationary member (or a stator) and a movable member is constituted by arranging a plurality of electrodes on a film-like insulating substrate, and a multi-phase AC voltage is applied to the respective sets of electrodes of the stationary member and the movable member so as to move the movable member relative to the stationary member. As compared to an electric motor using an electromagnetic force, this type of the electrostatic motor does not require a large mass component, such as a magnetic coil or a permanent magnet, and thus can be easily fabricated in a small size, which permits it to be utilized as, e.g., a drive source for a micro-machine.

Japanese Unexamined Patent Publication (Kokai) No. 6-78566 (JP6-78566A) discloses an electrostatic motor provided with a stationary member including an insulating substrate and a plurality of electrodes arranged along a major surface of the insulating substrate at predetermined intervals, and a movable member including another insulating substrate and a plurality of electrodes arranged on a major surface of the insulating substrate at predetermined intervals. In this electrostatic motor, the stationary member and the movable member are assembled together relatively movably in a direction along the major surfaces thereof, with the respective plural electrodes (usually, strip-shaped or line-shaped electrodes) being regularly opposed to each other. In this state, a three-phase AC voltage is applied to, e.g., every three parallel electrodes in the respective sets of electrodes of the stationary member and the movable member, to generate an electrostatic force between the two sets of electrodes due to traveling-wave electric fields having different phases, so that a driving force is generated in the movable member so as to act in a direction of the parallel arrangement of the electrodes (or in the direction along the major surface).

JP6-78566A also discloses a laminated configuration constructed by alternately stacking plural stationary members and plural movable members, so as to provide plural sets of stationary members and movable members, each set having opposing electrodes, for the purpose of increasing the output power of a single motor. JP6-78566A further discloses a linear electrostatic motor in which the movable member linearly moves relative to the stationary member, and a rotary electrostatic motor in which the movable member rotates about an axis relative to the stationary member.

In the electrostatic motor of the above-described type, the stationary member and the movable member, both formed as film-like members, have a small rigidity and thus are difficult to maintain their own shapes and to keep a clearance therebetween a predetermined dimension In this context, the solution has been proposed, in which a clearance is maintained by a large number of fine grains, such as glass beads, distributed between the stationary member and the movable member, as disclosed in, e.g., Akio Yamamoto, Toshiki Niino, Toshiro Higuchi, "High-Precision Positioning Control using High-Power Electrostatic Linear Drive", Journal of the Japanese Society for Precision Engineering (JSPE), Vol. 64, No. 9, 1998, pp. 1385 to 1389.

In the above constitution wherein the clearance between the film-like stationary and movable members is controlled by fine grains, the fine grains, such as glass beads, distributed between the opposing surfaces of the stationary and movable members are interposed therebetween basically in a free state. Therefore, when the movable member moves relative to the stationary member during an operation of the electrostatic motor, the fine grains (or glass beads) tend to move accompanying thereto, which may cause the unbalanced distribution of the fine grains between the opposing surfaces. If the fine grains (or glass beads) are distributed in an unbalanced manner between the stationary member and the movable member, the clearance between the stationary and movable members may lose uniformity, and thereby the characteristics of the electrostatic motor may be varied.

SUMMARY OF THE INVENTION

It is an object of the present invention to provide an electrostatic motor including a stationary member and a movable member, both formed as film-like members, in which it is possible to easily control and surely keep a clearance between the stationary member and the movable member without using fine grains.

In order to accomplish the above object, the present invention provides an electrostatic motor comprising a stationary member including a first major surface and a first back surface opposite to the first major surface; a movable member including a second major surface and a second back surface opposite to the second major surface, the movable member being arranged to be movable relative to the stationary member in a condition where the second major surface is opposed to the first major surface of the stationary member; and a protuberance provided to project from at least one of the first major surface of the stationary member and the second major surface of the movable member, the protuberance ensuring a predetermined clearance between the first major surface and the second major surface.

In the above electrostatic motor, the protuberance may be provided on each of the first major surface of the stationary member and the second major surface of the movable member; and, when the stationary member and the movable member are arranged to be opposed to each other, the protuberance of the stationary member and the protuberance of the movable member may be engaged with each other, without hampering a motion of the movable member relative to the stationary member, to locate the stationary member and the movable member at a proper relative position.

In this arrangement, a height of the protuberance of the stationary member on the first major surface may be different from a height of the protuberance of the movable member on the second major surface.

The stationary member may include a base film, a plurality of electrodes carried on the base film and a cover film attached to the base film and covering the plurality of electrodes, the cover film defining the first major surface; the movable member may include a base film, a plurality of electrodes carried on the base film and a cover film attached to the base film and covering the plurality of electrodes, the cover film defining the second major surface; and the protuberance may be integrally formed on at least one of the cover film of the stationary member and the cover film of the movable member.

In this arrangement, at least one of a surface of the protuberance and a surface of the cover film of each of the stationary member and the movable member may be made of a low-friction material exhibiting an excellent sliding property.

The above electrostatic motor may comprise a plurality of stationary members and a plurality of movable members, assembled with each other in a manner as to alternately arrange the stationary members and the movable members one by one. In this arrangement, the electrostatic motor may further comprise a back-side protuberance provided to project from at least one of the first back surface of each of the stationary members and the second back surface of each of the movable members, the back-side protuberance ensuring a predetermined clearance between the first back surface and the second back surface.

In the above configuration, the back-side protuberance may be provided on each of the first back surface of each stationary member and the second back surface of each movable member; and, when the stationary members and the movable members are assembled together, the back-side protuberance of the stationary member and the back-side protuberance of the movable member opposing the stationary member may be engaged with each other, without hampering a motion of the movable member relative to the stationary member, to locate the stationary member and the movable member at a proper relative position.

In this arrangement, a height of the back-side protuberance of the stationary member on the first back surface may be different from a height of the back-side protuberance of the movable member on the second back surface.

The stationary member may include a base film, a plurality of electrodes carried on the base film and a cover film attached to the base film, the cover film defining the first back surface; the movable member may include a base film, a plurality of electrodes carried on the base film and a cover film attached to the base film, the cover film defining the second back surface; and the back-side protuberance may be integrally formed on at least one of the cover film of the stationary member and the cover film of the movable member.

In this arrangement, at least one of a surface of the back-side protuberance and a surface of the cover film of each of the stationary member and the movable member may be made of a low-friction material exhibiting an excellent sliding property.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

Figure 1:
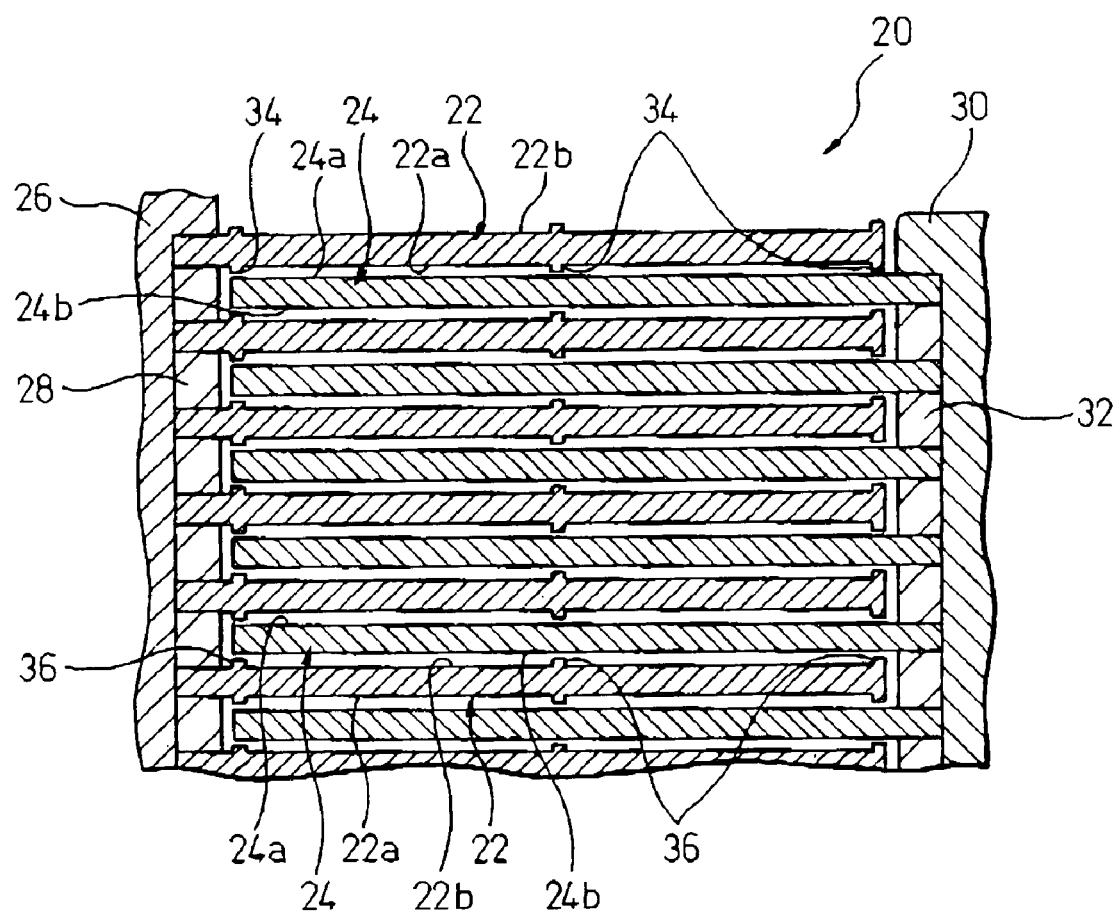
FIG. 1 is a sectional view schematically showing the configuration of an electrostatic motor according to a first embodiment of the present invention.

The embodiments of the present invention are described below in detail, with reference to the accompanying drawings. In the drawings, the same or similar components are denoted by common reference numerals.

First, the essential configuration of an electrostatic motor, to which the present invention is applicable, is described with reference to FIGS. 8 to 11.

Figure 8:
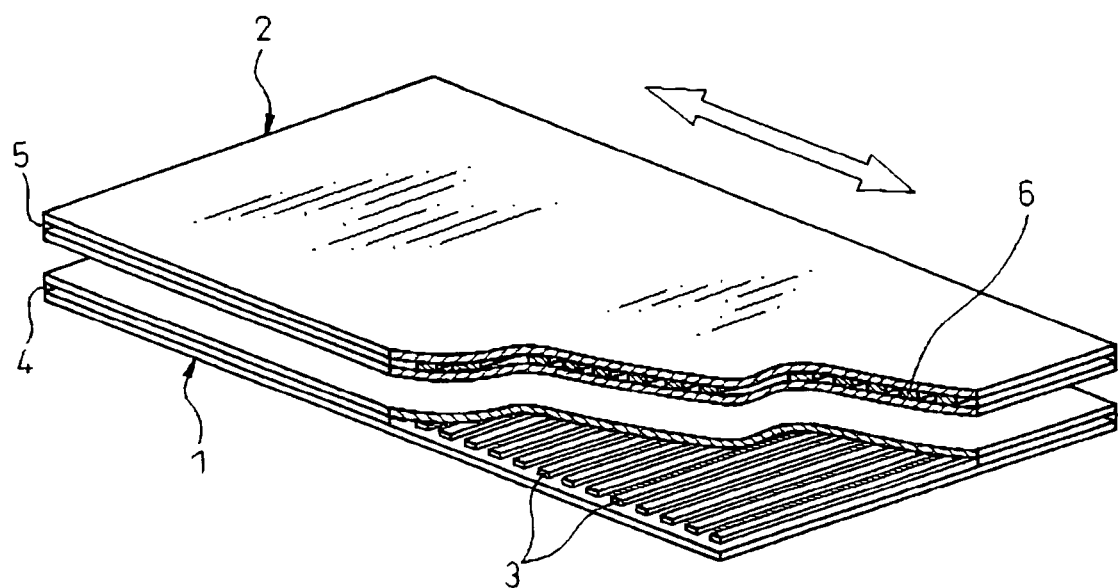
FIG. 8 is a partly cut-away perspective view showing the essential configuration of a linear electrostatic motor, to which the present invention is applicable.
Figure 9:
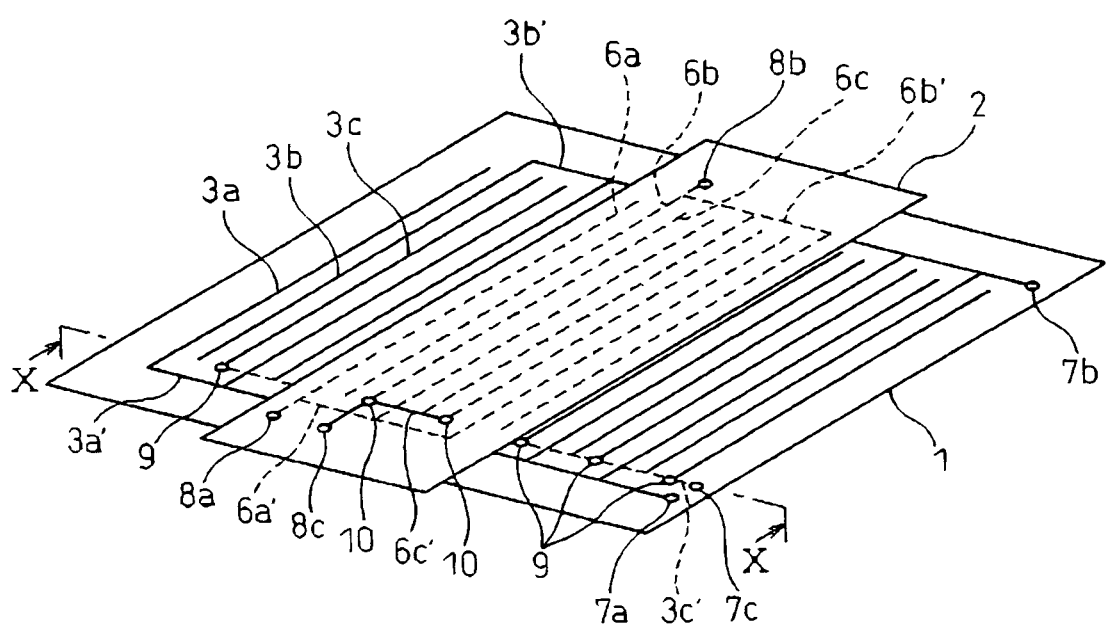
FIG. 9 is a plan view schematically showing the essential configuration of a conductor pattern in a stationary member and a movable member in the linear electrostatic motor of FIG. 8.
Figure 10:
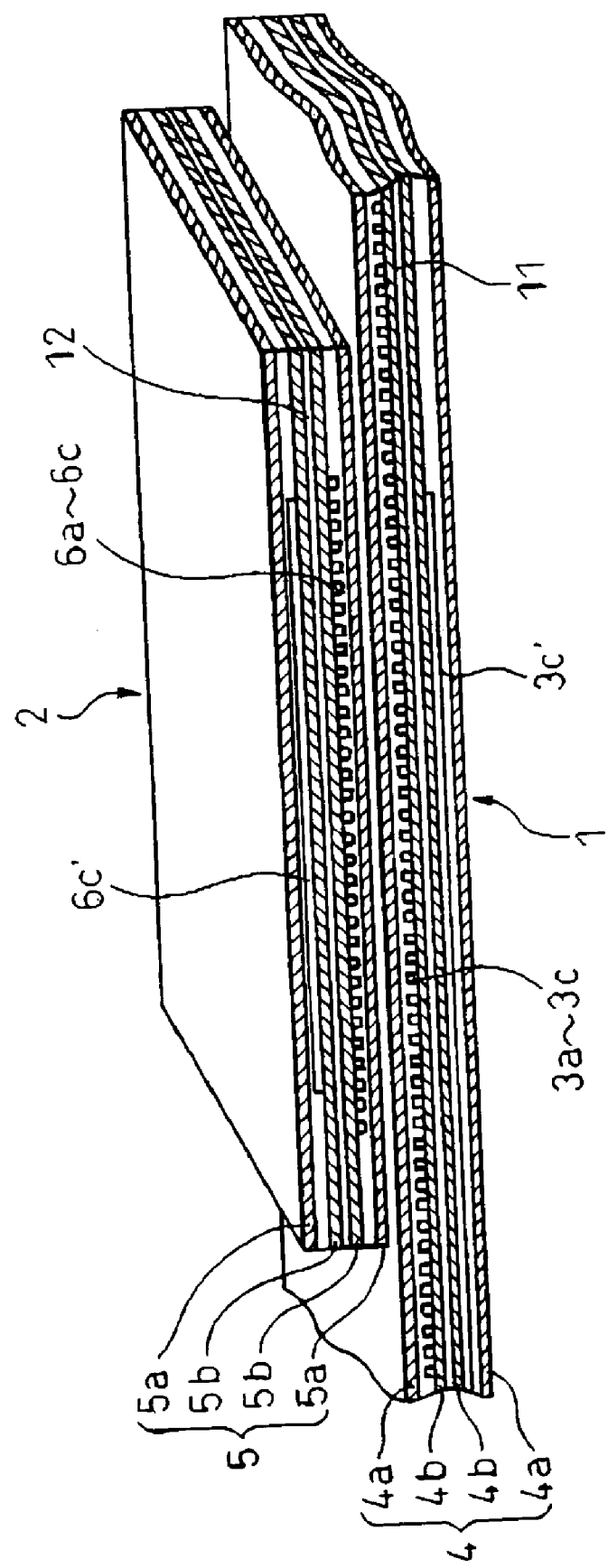
FIG. 10 is a sectional view taken along a line X-X in FIG. 9.

FIGS. 8 to 10 show the essential configuration of a linear electrostatic motor. As shown in FIG. 8, a stationary member (or a stator) 1, formed as a film-like member, includes a plurality of multi-phase electrodes 3 formed, e.g., as electrically conductive strip-shaped laminas, such as copper foils, or thin wires, which are embedded in an insulator 4 in a parallel arrangement at predetermined regular intervals. Also, a movable member (or a translating member) 2, formed as a film-like member, includes a plurality of multi-phase electrodes 6 embedded in an insulator 5 in a way similar to the stationary member. In the illustrated embodiment, the stationary member 1 and the movable member 2 are connected to a three-phase AC power source.

As shown in FIG. 9, the stationary member 1 is provided with a plurality of electrodes 3a, 3b, 3c, voltage input portions 7a, 7b, 7c connected respectively to the first, second and third phases of the three-phase AC power source, and current paths 3a', 3b', 3c' for respectively connecting the voltage input portions 7a, 7b, 7c to the respective-phase electrodes 3a, 3b, 3c. In the stationary member 1, the plural first-phase electrodes 3a, 3a, . . . are connected through the current path 3a' to the voltage input portion 7a connected to the first phase of the three-phase AC power source, the plural second-phase electrodes 3b, 3b, . . . are connected through the current path 3b' to the voltage input portion 7b connected to the second phase of the power source, and the plural third-phase electrodes 3c, 3c, . . . are connected through the current path 3c' to the voltage input portion 7c connected to the third phase of the power source. In order to prevent the first to third-phase current paths 3a', 3b', 3c' from coming into conductive contact with each other, the first and second-phase current paths 3a', 3b' (represented by solid lines) are disposed along the major surface of the insulator 4, while the third-phase current path 3c' (represented by a broken line) is disposed along the back surface of the insulator 4 and is connected to the third-phase electrode 3c via a through-hole electrically conductive portion 9.

The movable member 2 has a conductor pattern similar to that of the stationary member 1. More specifically, the movable member 2 is provided with a plurality of electrodes 6a, 6b, 6c, voltage input portions 8a, 8b, 8c connected respectively to the first, second and third phases of the three-phase AC power source, and current paths 6a', 6b', 6c' for respectively connecting the voltage input portions 8a, 8b, 8c to the respective-phase electrodes 6a, 6b, 6c. In the movable member 2, the plural first-phase electrodes 6a, 6a, . . . are connected through the current path 6a' (represented by a broken line) to the voltage input portion 8a connected to the first phase of the three-phase AC power source, the plural second-phase electrodes 6b, 6b, . . . are connected through the current path 6b' (represented by a broken line) to the voltage input portion 8b connected to the second phase of the power source, and the plural third-phase electrodes 6c, 6c, . . . are connected through the current path 6c' (represented by a solid line) and a through-hole conductive portion 10 to the voltage input portion 8c connected to the third phase of the power source.

As apparent from a section shown in FIG. 10, the stationary member 1 has a construction in which a first base film (or an insulating substrate) 4b provided with the current path 3c', formed through an adhering step with an adhesive, an etching step and so on, and a second base film (or an insulating substrate) 4b provided with the plural electrodes 3a, 3b, 3c and the current paths 3a', 3b', formed through an adhering step with an adhesive, an etching step and so on, are adhered by an adhesive 11 with each other in an opposite or back-to-back orientation. Further, cover films 4a are attached to the surfaces of the respective base films 4b, so as to form insulation layers covering the conductor patterns. In other words, the stationary member 1 has a laminated structure composed of a layer of the first cover film 4a, a layer of the current path 3c' and adhesive, a layer of the first base film 4b, a layer of the adhesive 11, a layer of the second base film 4b, a layer of the electrodes 3a, 3b, 3c, current paths 3a', 3b' and adhesive, and a layer of the second cover film 4a.

Similarly, the movable member 2 has a construction in which a first base film (or an insulating substrate) 5b provided with the current path 6c' and a second base film (or an insulating substrate) 5b provided with the plural electrodes 6a, 6b, 6c and the current paths 6a', 6b', are adhered by an adhesive 12 with each other in an opposite or back-to-back orientation. Further, cover films 5a are attached to the surfaces of the respective base films 5b, so as to form insulation layers covering the conductive patterns. In other words, the movable member 2 has a laminated structure composed of a layer of the first cover film 5a, a layer of the current path 6c' and adhesive, a layer of the first base film 5b, a layer of the adhesive 12, a layer of the second base film 5b, a layer of the electrodes 6a, 6b, 6c, current paths 6a', 6b' and adhesive, and a layer of the second cover film 5a. In the conventional electrostatic motor, fine grains, such as glass beads, are distributed between the stationary member 1 and the movable member 2, so as to maintain a predetermined clearance between the stationary member 1 and the movable member 2.

The respective-phase output terminals of a multi-phase (three-phase, in the illustrated embodiment) AC power source are connected respectively to the voltage input portions 7a, 7b, 7c of the stationary member 1 and to the voltage input portions 8a, 8b, 8c of the movable member 2. As a result, traveling-wave electric fields are generated respectively in the stationary member 1 and the movable member 2, whereby the movable member 2 undergoes a linear motion (shown by an arrow) relative to the stationary member 1 due to the traveling-wave electric fields. In this configuration, it is possible to produce a laminated-type linear electrostatic motor by stacking plural sets of stationary and movable members, each set including mutually opposed stationary member 1 and movable member 2, for the purpose of increasing an output power.

Figure 11:
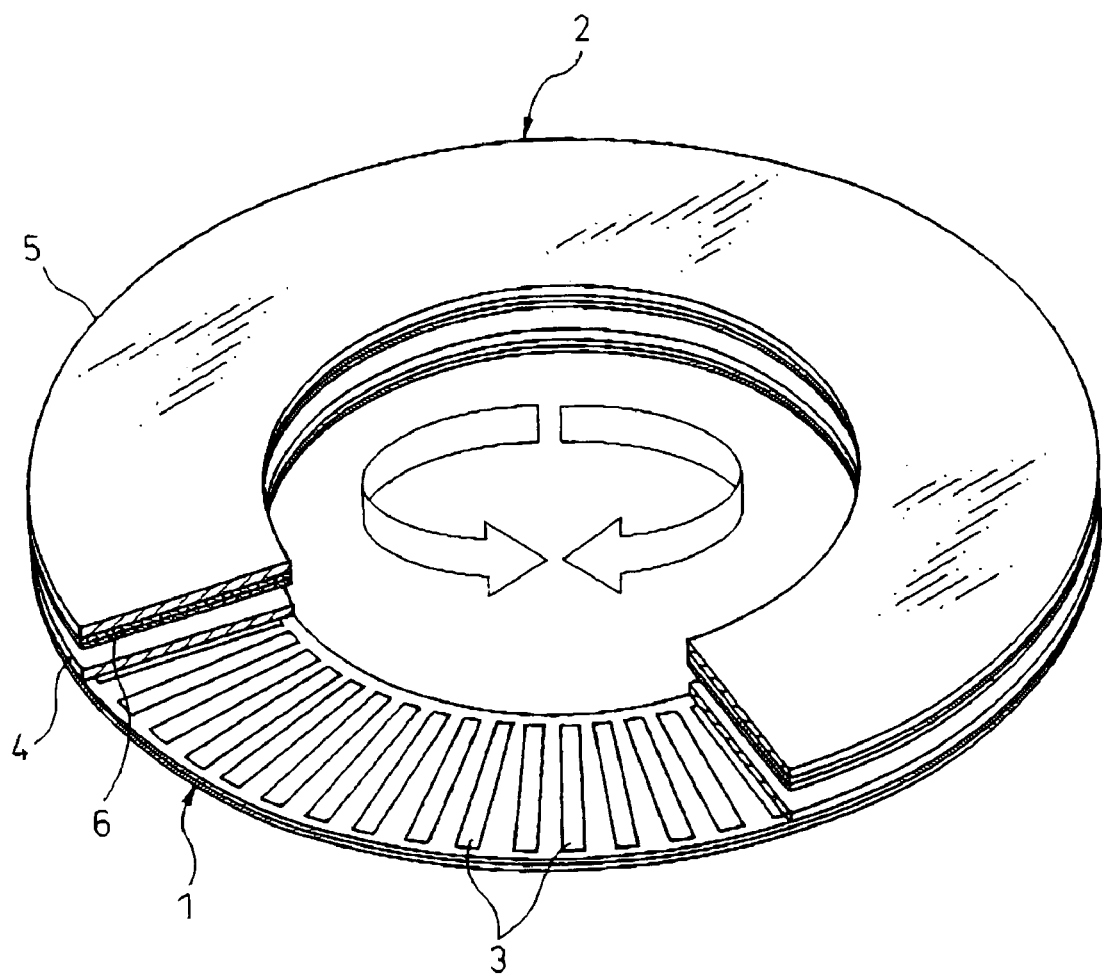
FIG. 11 is a partly cut-away perspective view showing the essential configuration of a rotary electrostatic motor, to which the present invention is applicable.

FIG. 11 schematically shows the essential configuration of a rotary electrostatic motor. The illustrated rotary electrostatic motor has substantially the same configuration as that of the linear electrostatic motor of FIGS. 8 to 10, except that a plurality of multi-phase electrodes 3, 6 are arranged radially at regular intervals, and thus the corresponding components are denoted by the same reference numerals. A stationary member 1, formed as a film-like member, includes a plurality of multi-phase electrodes 3 formed, e.g., as electrically conductive strip-shaped laminas or thin wires, which are embedded in an insulator 4 in a radial arrangement at predetermined regular intervals. A movable member (or a rotor) 2, formed as a film-like member, includes a plurality of electrodes 6 embedded in an insulator 5 in a way similar to the stationary member. In the conventional electrostatic motor, fine grains, such as glass beads, are distributed between the stationary member 1 and the movable member 2, as to maintain a predetermined clearance between the stationary member 1 and the movable member 2.

In the rotary electrostatic motor, a multi-phase AC power source is also connected respectively to the stationary member 1 and the movable member 2, so as to generate traveling-wave electric fields, whereby the movable member 2 undergoes a rotary motion (shown by an arrow) relative to the stationary member 1 due to the traveling-wave electric fields. In this configuration, it is also possible to produce a laminated-type rotary electrostatic motor by stacking plural sets of stationary and movable members, each set including mutually opposed stationary member 1 and movable member 2, for the purpose of increasing an output power.

Figure 2:
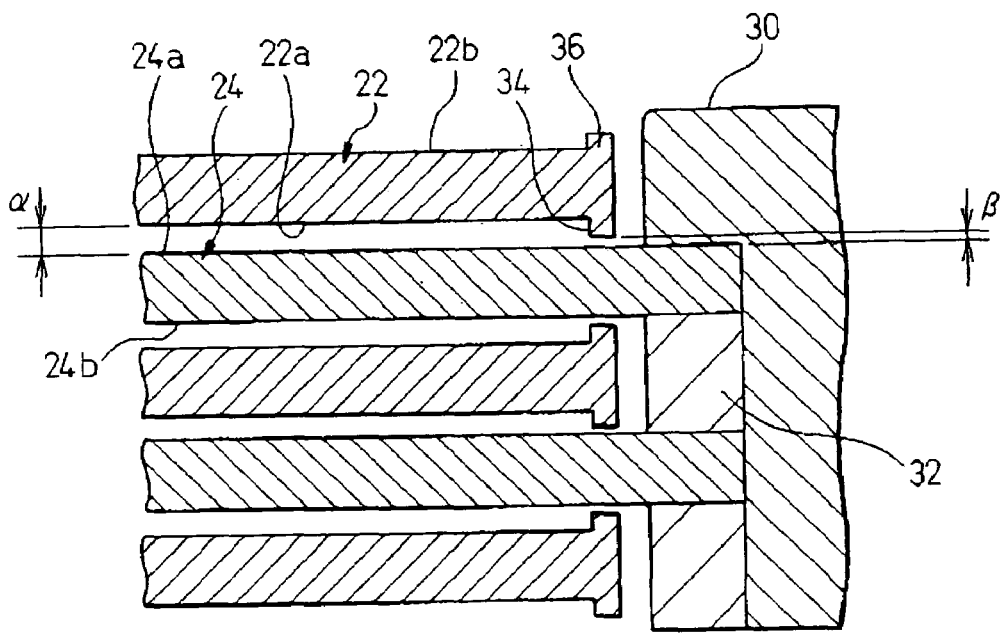
FIG. 2 is an enlarged sectional view of a part of the electrostatic motor of FIG. 1, illustrating a clearance between a stationary member and a movable member.
Figure 3:
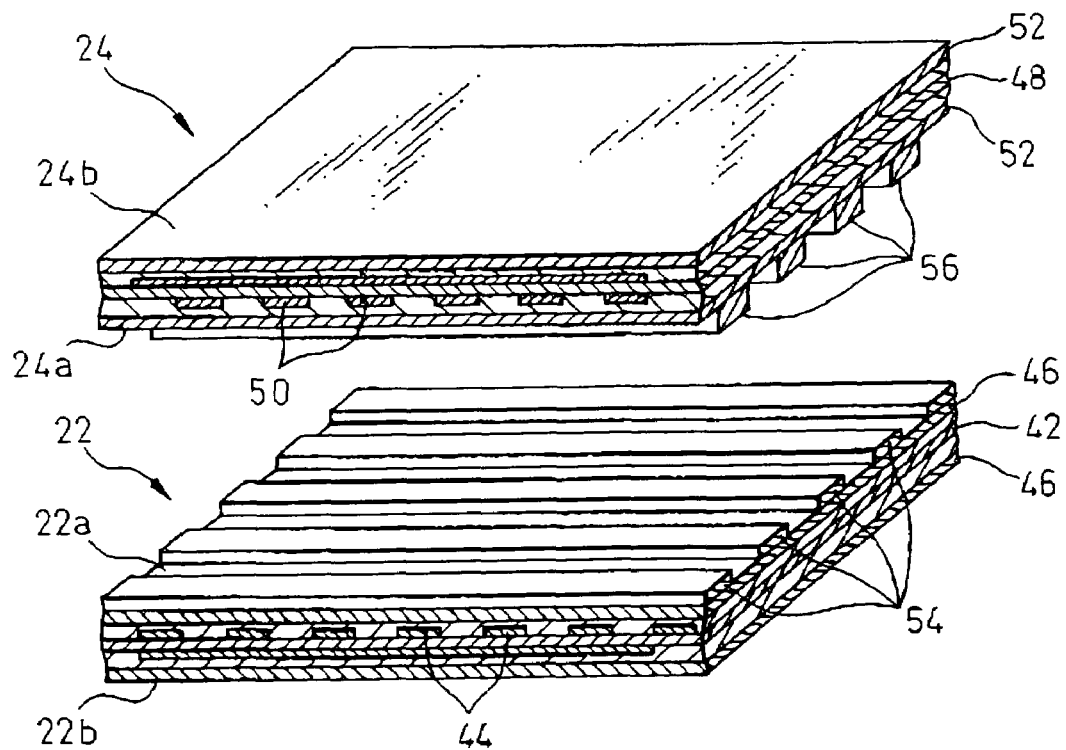
FIG. 3 is a perspective view schematically showing, in a disassembled manner, the configuration of an electrostatic motor according to a second embodiment of the present invention.

Next, with reference to FIGS. 1 and 2, the configuration of an electrostatic motor 20 according to a first embodiment of the invention is described, that can be applied to the electrostatic motor having the above-described essential configuration.

Referring to FIG. 1, the electrostatic motor 20 is provided with a film-shaped stationary member 22 including a first major surface 22a and a first back surface 22b opposite to the first major surface 22a, and a film-shaped movable member 24 including a second major surface 24a and a second back surface 24b opposite to the second major surface 24b. The movable member 24 is arranged to be movable relative to the stationary member 22 in a condition where the second major surface 24a is opposed to the first major surface 22a of the stationary member 22. The stationary member 22 and the movable member 24 have film-laminated structures identical respectively to those of the stationary member 1 and the movable member 2 shown in FIGS. 8 to 11. Further, the electrostatic motor 20 has a high-power stacked configuration constituted by assembling a plurality of stationary members 22 and a plurality of movable members 24 in a manner as to alternately arrange the stationary members 22 and the movable members 24 one by one.

The plural stationary members 22 are securely supported on a housing 26 in a condition where the first major surface 22a of one stationary member 22 faces to the first back surface 22b of another stationary member 22. The gap between the opposing stationary members 22 arranged side-by-side is ensured by a spacer 28 interposed therebetween. Also, the plural movable members 24 are securely supported on a housing (or a slider or a rotary shaft) 30 in a condition where the second major surface 24a of one movable member 24 faces to the second back surface 24b of another movable member 24. The gap between the opposing movable members 24 arranged side-by-side is ensured by a spacer 32 interposed therebetween. In this state, the first major surface (or an effective driving surface) 22a of the stationary member 22 and the second major surface (or an effective driving surface) 24a of the movable member 24 are arranged to be opposed to each other through a predetermined small clearance $\alpha$ (FIG. 2) defined therebetween. Therefore, the thickness of the spacer 28 interposed between the stationary members 22 is dimensioned as to be equal to [the predetermined clearance $\alpha$ (between the stationary member 22 and the movable member 24)$\times$2+ the thickness of the movable member 24], while the thickness of the spacer 32 interposed between the movable members 24 is dimensioned as to be equal to [the predetermined clearance $\alpha \times$2+ the thickness of the stationary member 22].

The electrostatic motor 20 is also provided with a protuberance 34 provided to project from at least one of the first major surface 22a of the stationary member 22 and the second major surface 24a of the movable member 24. In the illustrated embodiment, the protuberances 34 are locally formed to be spaced from each other at suitable intervals, on the first major surface 22a of each stationary member 22, at the opposite-ends and center positions in an area thereof facing the second major surface 24a of the opposing movable member 24. The electrostatic motor 20 is further provided with a back-side protuberance 36 provided to project from at least one of the first back surface 22b of the stationary member 22 and the second back surface 24b of the movable member 24. In the illustrated embodiment, the back-side protuberances 36 are locally formed to be spaced from each other at suitable intervals, on the first back surface 22b of each stationary member 22, at the opposite-ends and center positions in an area thereof facing the second back surface 24b of the opposing movable member 24.

As shown in FIG. 2 in an enlarged scale, the height of each protuberance 34 (i.e., a projecting amount from the first major surface 22a of the stationary member 22) is selected so that a clearance $\beta$ between the top face of the protuberance 34 and the second major surface 24a of the opposing movable member 24 is several-ten percent of the predetermined clearance $\alpha$ inherently required between the stationary member 22 and the movable member 24. The height of each back-side protuberance 36 (i.e., a projecting amount from the first back surface 22b of the stationary member 22) is also selected in a way similar to the protuberance 34. Due to the provision of the protuberance 34 and the back-side protuberance 36, even when, e.g., either one or both of the stationary and movable members 22, 24 is subjected to a bending action, the bending action is received and hampered by the protuberance 34 and the back-side protuberance 36. As a result, it is possible to ensure and maintain the predetermined clearance $\alpha$ substantially uniform as a whole, between the first major surface 22a of the film-shaped stationary member 22 and the second major surface 24a of the film-shaped movable member 24, as well as between the first back surface 22b of the stationary member 22 and the second back surface 24b of the movable member 24.

The protuberance 34 and/or the back-side protuberance 36 of the stationary member 22 may come in contact with the surface (i.e., the second major surface 24a and/or the second back surface 24b) of the movable member 24 during a period when the movable member 24 moves, and may thus be worn out. In order to effectively suppress such a wearing, it is advantageous that the protuberance 34 and/or the back-side protuberance 36 is made of a low-friction material. For example, because the stationary member 22 has the film-laminated structure identical to the stationary member 1, it is possible to integrally form the protuberance 34 and/or the back-side protuberance 36 on the exposed surface of a cover film (corresponding to the cover film 4a in FIG. 10) by a suitable process such as photo-etching, sandblast polishing or injection molding. In this case, it is possible to easily produce the stationary member 22 provided with the protuberance 34 and/or the back-side protuberance 36, by preparing the cover film including the protuberance 34 or the back-side protuberance 36 previously formed on the surface thereof, and adhering the cover film onto a base film (corresponding to the base film 4b in FIG. 10) including a plurality of electrodes formed by etching.

In this connection, a resinous material exhibiting excellent sliding property, such as PTFE (polytetrafluoroethylene), may be used as the low-friction material. Also, it is advantageous that a cover film of the movable member 24, coming into sliding contact with the protuberance 34 and/or the back-side protuberance 36, is formed from a low-friction material to prevent wear, in the same way as the protuberances. In other words, when the cover films as the outer sheathes of the stationary member 22 and the movable member 24 are formed by using the low-friction material such as PTFE, it is possible to reduce the wear of the protuberance 34 and/or the back-side protuberance 36 of the stationary member 22 as well as of the second major surface 24a and/or the second back surface 24b of the movable member 24.

Note that, in place of or in addition to the above arrangement of the illustrated embodiment, wherein the stationary member 22 is provided with the protuberance 34 and the back-side protuberance 36, the movable member 24 may be provided with the protuberance 34 and the back-side protuberance 36. In the case where both the stationary member 22 and the movable member 24 are provided with the protuberance 34 and the back-side protuberance 36, it is advantageous that, between the stationary member 22 and the movable member 24, the protuberance 34 and the back-side protuberance 36 does not face to each other but is shifted from each other, so as to effectively prevent the stationary and movable members 22, 24 from being bent relative to each other. Further, in the case where the electrostatic motor 20 has a base unit structure including a single stationary member 22 and a single movable member 24, the back-side protuberance 36 is basically unnecessary.

FIGS. 3 to 7 show an electrostatic motor 40 according to a second embodiment of the present invention. The electrostatic motor 40 has a configuration substantially identical to that of the above-described electrostatic motor 20 except for the constitution of a protuberance for maintaining a predetermined clearance between a stationary member and a movable member. Therefore, corresponding components are denoted by common reference numerals, and the description thereof is not repeated.

The stationary member 22 of the electrostatic motor 40 includes a base film (or an insulating substrate) 42, conductive portions including a plurality of electrodes 44 and current paths (corresponding to electrodes 3a to 3c and current paths 3a' to 3c' of the stationary member 1 in FIG. 10) suitably patterned on the opposite surfaces of the base film 42, and cover films 46 attached to the opposite surfaces of the base film 42 and covering the conductive portions. Also, the movable member 24 includes a base film (or an insulating substrate) 48, conductive portions including a plurality of electrodes 50 and current paths (corresponding to electrodes 6a to 6c and current paths 6a' to 6c' of the movable member 2 in FIG. 10) suitably patterned on the opposite surfaces of the base film 48, and cover films 52 attached to the opposite surfaces of the base film 48 and covering the conductive portions. Further, a plurality of protuberances 54 are provided to project from the first major surface 22a of the stationary member 22 and a plurality of protuberances 56 are provided to project from the second major surface 24a of the movable member 24 opposing the first major surface 22a, for ensuring and maintaining a predetermined clearance between the mutually opposing surfaces 22a, 24a.

The protuberances 54 of the stationary member 22 and the protuberances 56 of the movable member 24 are shaped and dimensioned in a manner as to be brought into engagement with each other, without hampering the normal motion of the movable member 24 relative to the stationary member 22, when the stationary member 22 and the movable member 24 are arranged to be opposed to each other. More specifically, each of the protuberances 54, 56 is shaped as a rib having a rectangular cross-section, and continuously extends in a direction parallel to the moving direction of the movable member 24 relative to the stationary member 22 during the operation of the electrostatic motor 40. Further, the height of each protuberance 54 of the stationary member 22 (i.e., a projecting amount from the first major surface 22a) is different from the height of each protuberance 56 of the movable member 24 (i.e., a projecting amount from the second major surface 24a). In the illustrated embodiment, the height of the protuberance 56 provided in the movable member 24 is larger than the height of the protuberance 54 provided in the stationary member 22.

Figure 4:
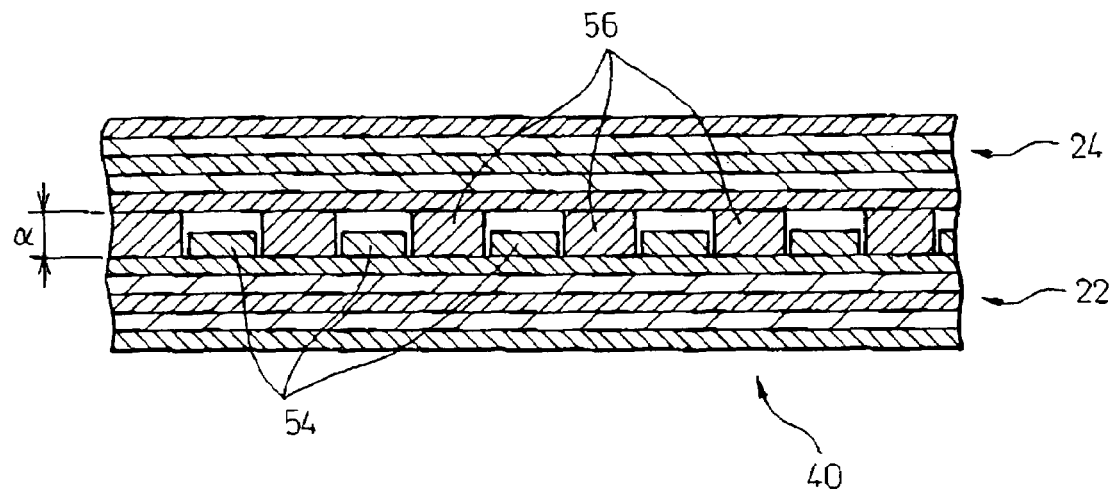
FIG. 4 is a sectional view showing an opposing relationship of a stationary member and a movable member in the electrostatic motor of FIG. 3.

FIG. 4 shows, as a sectional view, the electrostatic motor 40 in a constructed condition where the stationary member 22 is arranged to be opposed to the movable member 24. As illustrated, the clearance α between the stationary member 22 and the movable member 24 is ensured and maintained by the plural higher protuberances 56 provided in the movable member 24. The plural lower protuberances 54 provided in the stationary member 22 are received between the protuberances 56 of the movable member 24 to be engaged with the protuberances 56, and act to locate the stationary member 22 and the movable member 24 at a proper relative position. As a result, it is possible to easily control the alignment between the stationary member 22 and the movable member 24.

Figure 5:
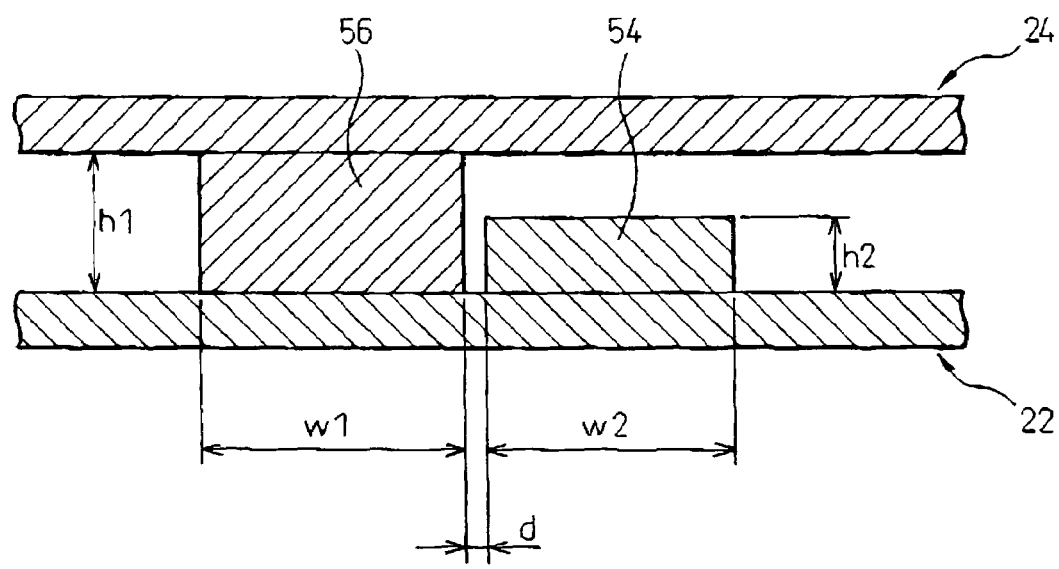
FIG. 5 is an enlarged sectional view of a part of the electrostatic motor of FIG. 3, illustrating a clearance between a stationary member and a movable member.

As shown in, e.g., FIG. 5, in which the height and width of the protuberance 56 are denoted respectively by h1 and w1, and the height and width of the protuberance 54 are denoted respectively by h2 and w2, the protuberances 54 of the stationary member 22 and the protuberances 56 of the movable member 24 are designed to be arranged respectively at regular intervals, provided that h1>h2, and that the width dimension of an area occupied by a set of mutually engaging protuberances 54, 56 is [w1+w2+2d], where "d" is a suitable small size required for enabling the movable member 24 to smoothly move relative to the stationary member 22. According to this arrangement, when the stationary member 22 and the movable member 24 are disposed to be opposed to each other, the protuberances 54 are brought into engagement with the protuberances 56, so as to maintain the clearance α between the stationary member 22 and the movable member 24 as to be "h1". Besides, due to the positioning function of the protuberances 54, 56, it is possible for the movable member 24 to be correctly guided in a normal moving direction relative to the stationary member 22 and thus to smoothly move.

Figure 6A:
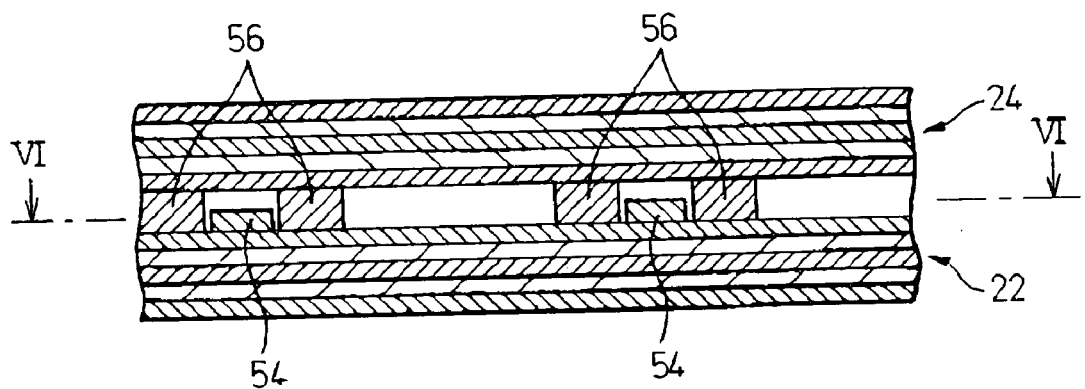
FIGS. 6A and 6B are sectional views showing a modified embodiment of the electrostatic motor of FIG. 3.
Figure 6B:
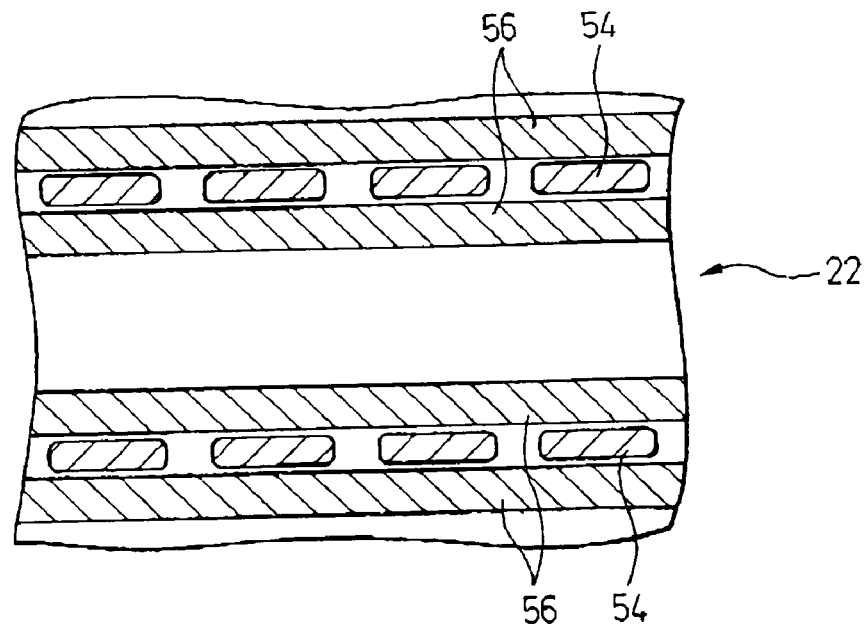

Although, in the illustrated embodiment, the protuberances 54 of the stationary member 22 and the protuberances 56 of the movable member 24 are formed to be arranged at even regular intervals, this is not an indispensable feature, but it may be adopted, as shown in, e.g., FIG. 6A, that sets of mutually engaging protuberances 54, 56 are arranged at desired intervals different from the intervals of the identical protuberances 54 (or 56). Also, instead of the protuberances 54, 56 shaped as above-described continuous ribs, the protuberances 54, 56 formed to be divided into plural pieces in a direction of the relative movement of the stationary member 22 and the movable member 24, as shown, e.g., in FIG. 6B, may be adopted. In this connection, the illustration of FIG. 6B corresponds to the sectional view taken along a line VI-VI of FIG. 6A, and, in this example, each lower protuberance 54 provided in the stationary member 22 is formed to have such a divided shape. Note that the divided pieces of the protuberance 54 may have various shapes in the illustrated section, such as a rectangle, an ellipse, a triangle, a semicircle, a meandering curve, etc.

In the above electrostatic motor 40, it is also advantageous that each protuberance 54, 56 is made of a low-friction material, such as PTFE (polytetrafluoroethylene). In this case, the cover films 46, 52 as the outer sheaths of the stationary member 22 and the movable member 24 may be formed from a low-friction material, such as PTFE, integrally with the plural protuberances 54, 56, in a way similar to the electrostatic motor 20 as described.

Figure 7:
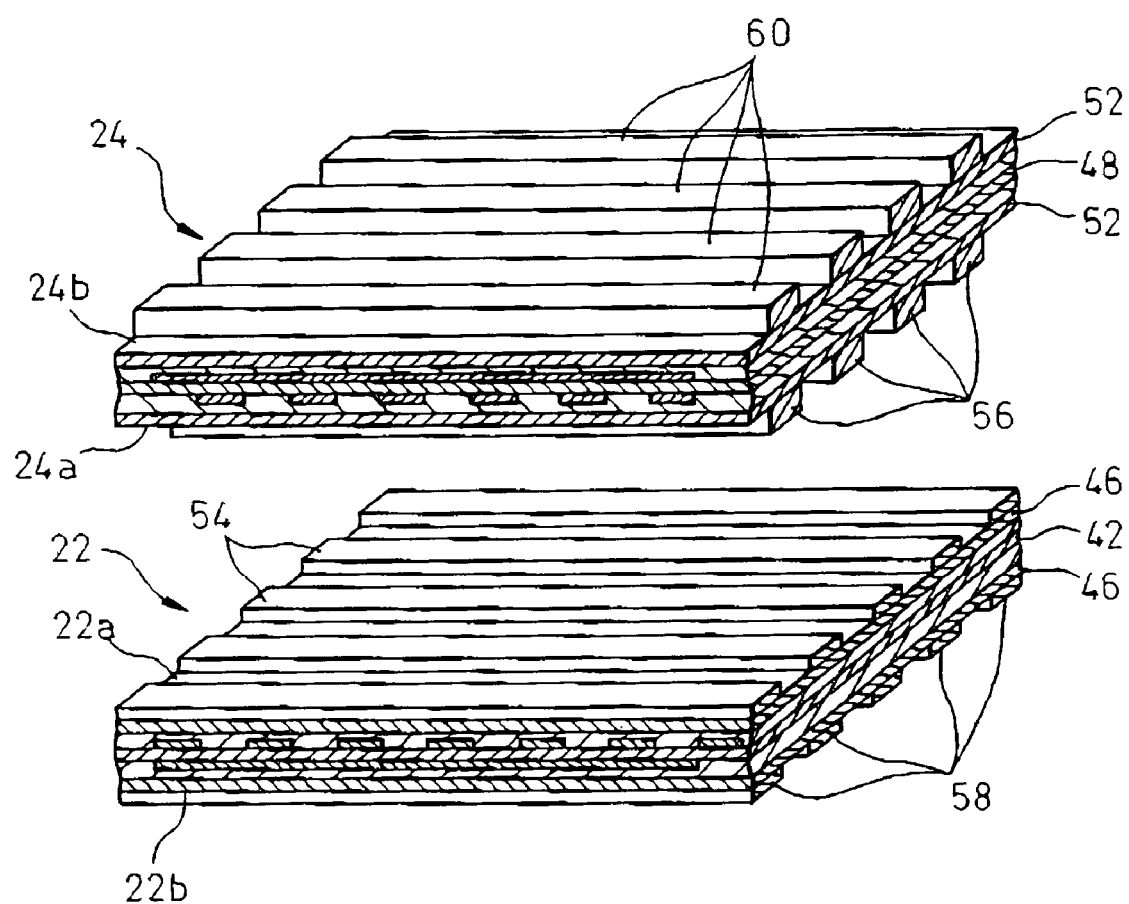
FIG. 7 is a perspective view schematically showing, in a disassembled manner, the configuration of another modified embodiment of the electrostatic motor of FIG. 3.

FIG. 7 shows a unit configuration including a set of the stationary member 22 and the movable member 24, in a high-power electrostatic motor, as a modified embodiment of the above electrostatic motor 40, which is constituted by assembling a plurality of stationary members 22 and a plurality of movable members 24 in a manner as to alternately arrange the stationary members 22 and the movable members 24. In this electrostatic motor, a plurality of lower back-side protuberances 58 are formed on the first back surface 22b of the stationary member 22 in an arrangement similar to the protuberances 54 on the first major surface 22a, and a plurality of higher back-side protuberances 60 are formed on the second back surface 24b of the movable member 24 in an arrangement similar to the protuberances 56 on the second major surface 24a. In this configuration, the back-side protuberances 58 of the stationary member 22 and the back-side protuberances 60 of the movable member 24 are engaged with each other, so as to locate the stationary member 22 of one unit and the movable member 24 of another unit at a proper relative position. As a result, it is possible to easily control the relative alignment between the stationary members 22 and the movable members 24 in the high-power electrostatic motor.

While the invention has been described with reference to specific preferred embodiments, it will be understood by those skilled in the art that various changes and modifications may be made thereto without departing from the spirit and scope of the following claims.

The invention claimed is:

1. An electrostatic motor comprising:
   a stationary member including a first major surface and a first back surface opposite to said first major surface;
   a movable member including a second major surface and a second back surface opposite to said second major surface, said movable member being arranged to be movable relative to said stationary member in a condition where said second major surface is opposed to said first major surface of said stationary member; and a protuberance provided to project from at least one of said first major surface of said stationary member and said second major surface of said movable member, said protuberance ensuring a predetermined clearance between said first major surface and said second major surface;

wherein said protuberance is provided on each of said first major surface of said stationary member and said second major surface of said movable member; and wherein, when said stationary member and said movable member are arranged to be opposed to each other, said protuberance of said stationary member and said protuberance of said movable member are arranged in an alternate manner and engagable with each other, without hampering a motion of said movable member relative to said stationary member, to locate said stationary member and said movable member at a proper relative position;

wherein said stationary member includes a base film, a plurality of electrodes carried on said base film and a cover film attached to said base film and covering said plurality of electrodes, said cover film defining said first major surface;

wherein said movable member includes a base film, a plurality of electrodes carried on said base film and a cover film attached to said base film and covering said plurality of electrodes, said cover film defining said second major surface; and wherein said protuberance is integrally formed on at least one of said cover film of said stationary member and said cover film of said movable member.

2. An electrostatic motor as set forth in claim 1, wherein a height of said protuberance of said stationary member on said first major surface is different from a height of said protuberance of said movable member on said second major surface.

3. An electrostatic motor as set forth in claim 1, wherein at least one of a surface of said protuberance and a surface of said cover film of each of said stationary member and said movable member is made of a low-friction material exhibiting an excellent sliding property.

4. An electrostatic motor as set forth in claim 1, comprising a plurality of stationary members and a plurality of movable members, assembled with each other in a manner as to alternately arrange said stationary members and said movable members one by one; and further comprising a back-side protuberance provided to project from at least one of said first back surface of each of said stationary members and said second back surface of each of said movable members, said back-side protuberance ensuring a predetermined clearance between said first back surface and said second back surface.

5. An electrostatic motor as set forth in claim 4, wherein said back-side protuberance is provided on each of said first back surface of each stationary member and said second back surface of each movable member; and wherein, when said stationary members and said movable members are assembled together, said back-side protuberance of said stationary member and said back-side protuberance of said movable member opposing said stationary member are arranged in an alternate manner and engagable with each other, without hampering a motion of said movable member relative to said stationary member, to locate said stationary member and said movable member at a proper relative position.

6. An electrostatic motor as set forth in claim 5, wherein a height of said back-side protuberance of said stationary member on said first back surface is different from a height of said back-side protuberance of said movable member on said second back surface.

7. An electrostatic motor as set forth in claim 4, wherein said stationary member includes a back-side cover film attached to said base film and defining said first back surface; wherein said movable member includes a back-side cover film attached to said base film and defining said second back surface; and wherein said back-side protuberance is integrally formed on at least one of said back-side cover film of said stationary member and said back-side cover film of said movable mender.

8. An electrostatic motor as set forth in claim 7, wherein at least one of a surface of said back-side protuberance and a surface of back-side said cover film of each of said stationary member and said movable member is made of a low-friction material exhibiting an excellent sliding property.

9. An electrostatic motor comprising:

a stationary member including a first major surface and a first back surface opposite to said first major surface;

a movable member including a second major surface and a second back surface opposite to said second major surface, said movable member being arranged to be movable relative to said stationary member in a condition where said second major surface is opposed to said first major surface of said stationary member; and a protuberance provided to project from at least one of said first major surface of said stationary member and said second major surface of said movable member, said protuberance ensuring a predetermined clearance between said first major surface and said second major surface;

wherein said protuberance is provided on each of said first major surface of said stationary member and said second major surface of said movable member;

wherein, when said stationary member and said movable member are arranged to be opposed to each other, said protuberance of said stationary member and said protuberance of said movable member are arranged in an alternate manner and engagable with each other, without hampering a motion of said movable member relative to said stationary member, to locate said stationary member and said movable member at a proper relative position;

wherein said electrostatic motor comprises a plurality of stationary members and a plurality of movable members, assembled with each other in a manner as to alternatively arrange said stationary members and said movable members one by one;

wherein said electrostatic motor further comprises a back-side protuberance provided to project from at least one of said first back surface of each of said stationary members and said second back surface of each of said movable members, said back-side protuberance ensuring a predetermined clearance between said first back surface and said second back surface;

wherein said stationary member includes a base film, a plurality of electrodes carried on said base film and a cover film attached to said base film, said cover film defining said first back surface;

wherein said movable member includes a base film, a plurality of electrodes carried on said base film and a cover film attached to said base film, said cover film defining said second back surface; and wherein said back-side protuberance is integrally formed on at least one of said cover film of said stationary member and said cover film of said movable member.

* * * * *